(12) United States Patent
Tzong et al.

(10) Patent No.: US 7,616,266 B2
(45) Date of Patent: Nov. 10, 2009

(54) LIQUID CRYSTAL PROJECTION SYSTEM

(75) Inventors: Ruey-Yau Tzong, Hsinchu (TW); Chien-Chih Hsiung, Hsinchu (TW)

(73) Assignee: Cinetron Technology Inc., Hsinchu (TW)

( * ) Notice: Subject to any disclaimer, the term of this patent is extended or adjusted under 35 U.S.C. 154(b) by 335 days.

(21) Appl. No.: 11/115,168

(22) Filed: Apr. 27, 2005

(65) Prior Publication Data
US 2006/0244871 A1  Nov. 2, 2006

(51) Int. Cl.
*G02F 1/1335* (2006.01)
*G03B 21/00* (2006.01)

(52) U.S. Cl. .................... 349/8; 349/5; 353/33
(58) Field of Classification Search ........... 349/9, 349/8, 5; 353/33
See application file for complete search history.

(56) References Cited

U.S. PATENT DOCUMENTS 6,490,087 B1 * 12/2002 Fulkerson et al. ......... 359/487
6,827,452 B2 * 12/2004 Tzong et al. .............. 353/33
7,044,607 B2 * 5/2006 Ouchi et al. ............... 353/31
2003/0030913 A1 * 2/2003 Park et al. ................. 359/634

FOREIGN PATENT DOCUMENTS

TW          556041        10/2003
TW          556041 A    * 10/2003

* cited by examiner

*Primary Examiner*—Michael H Caley
(74) *Attorney, Agent, or Firm*—Rosenberg, Klein & Lee

(57) ABSTRACT

A liquid crystal projection system has a dichroic mirror, a reflecting prism, a first and a second polarizing component, a dichroic component, a modulating device, and a projection lens. The dichroic mirror splits a polarized light source into dual primary color lights and a single primary color light. The reflecting prism receives the single primary color light and reflects it. The first and second polarizing components polarize the dual primary color lights and the single primary color light, respectively. The dichroic component is disposed beside the first polarizing component, and splits the dual primary color lights. The modulating device is disposed beside the second polarizing component and the dichroic component, and modulates the dual and single primary color lights into the other polarization and then reflects them. The projection lens is disposed beside the first polarizing component, and project the output light beam to a screen.

16 Claims, 6 Drawing Sheets

LIQUID CRYSTAL PROJECTION SYSTEM

BACKGROUND OF THE INVENTION

1. Field of the invention

The present invention relates to a liquid crystal projection system and, more particularly, to a liquid crystal projection system making use of three reflective-type liquid crystal panels to accomplish equal optical paths during projection.

2. Description of Related Art

Conventional CRT displays are not suitable for large-size displays because of volume and cost considerations. The liquid crystal projection technique provides a compact display with quality equal to that of the conventional CRT display.

Projector architecture is either single panel or three panel. The single panel projector has low resolution and low brightness, but is cheap. The three panel projector has high resolution and high brightness, but is expensive. The projection technique used presently is almost the mature transmission-type. The transmission-type projector, however, has the problem of a low aperture ratio.

TW. Pat. No. TW556,041 discloses a reflective-type projection technique, which makes use of three reflective-type liquid crystal panels for image projection to provide a high aperture ratio and a high resolution, bright display.

FIG. 1 shows the architecture of the liquid crystal projection system disclosed in TW. Pat. No. TW556,041. There are optical paths from a light source 11 to three reflective-type liquid crystal panels 20, 21, and 22 and optical paths from the reflective-type liquid crystal panels 20, 21, and 22 to a projection lens 23. In the optical paths from the light source 11 to the reflective-type liquid crystal panels 20, 21, and 22, light from the light source 11 is split into two light beams by a dichroic mirror 14, one being dual primary color polarized light beams Rp and Bp, the other being a single primary color polarized light beam Gp. The dual primary color polarized light beams Rp and Bp are transmitted through a polarizing beam splitter 16 and a dichroic prism 18 to the reflective-type liquid crystal panels 21 and 22, respectively. The single primary color polarized light beam Gp is transmitted through a reflecting mirror 15 and a polarizing beam splitter to the reflective-type liquid crystal panel 20.

In the above description, the single primary color polarized beam Gp is transmitted to the reflecting mirror 15 with air as the medium and then to reflective-type liquid crystal panel 20 through the polarizing beam splitter 17 made of glass material. The dual primary color polarized light beams Rp and Bp, however, are transmitted to the reflective-type liquid crystal panels 21 and 22 through the polarizing beam splitter 16 made of glass material. Therefore, the optical paths of the dual primary color polarized light beams Rp and Bp and the single primary color polarized light beam Gp from the light source 11 to the reflective-type liquid crystal panels 20, 21 and 22 are unequal, resulting in distortion and reduction of uniformity of the light source of the liquid crystal projection system during projection.

SUMMARY OF THE INVENTION

One object of the present invention is to provide a liquid crystal projection system, in which the optical path of the single primary color polarized light beam from the light source to the reflective-type liquid crystal panel and the optical path of the dual primary color polarized light beams from the light source to the reflective-type liquid crystal panels are equalized during projection by a reflecting prism.

To achieve the above object, the present invention makes use of a light source to emit a white light source. The white light source is polarized to produce a polarized light source. The polarized light source is split into dual primary color lights and a single primary color light by a dichroic mirror. The single primary color light is reflected by a reflecting prism for output. The dual primary color lights are polarized by a first polarizing component. The polarized dual primary color lights are sent to a dichroic component for splitting the dual primary color lights. A second polarizing component is disposed at one output side of the reflecting prism and used for polarizing the single primary color light. A modulating device is disposed beside the second polarizing component and the dichroic component and modulates the dual and single primary color lights into the other polarization and then reflects them for output. A projection lens is disposed beside the first polarizing component, receives the modulated dual and single primary color lights and then projects the output light beam to a screen.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE PREFERRED EMBODIMENTS

Figure 1:
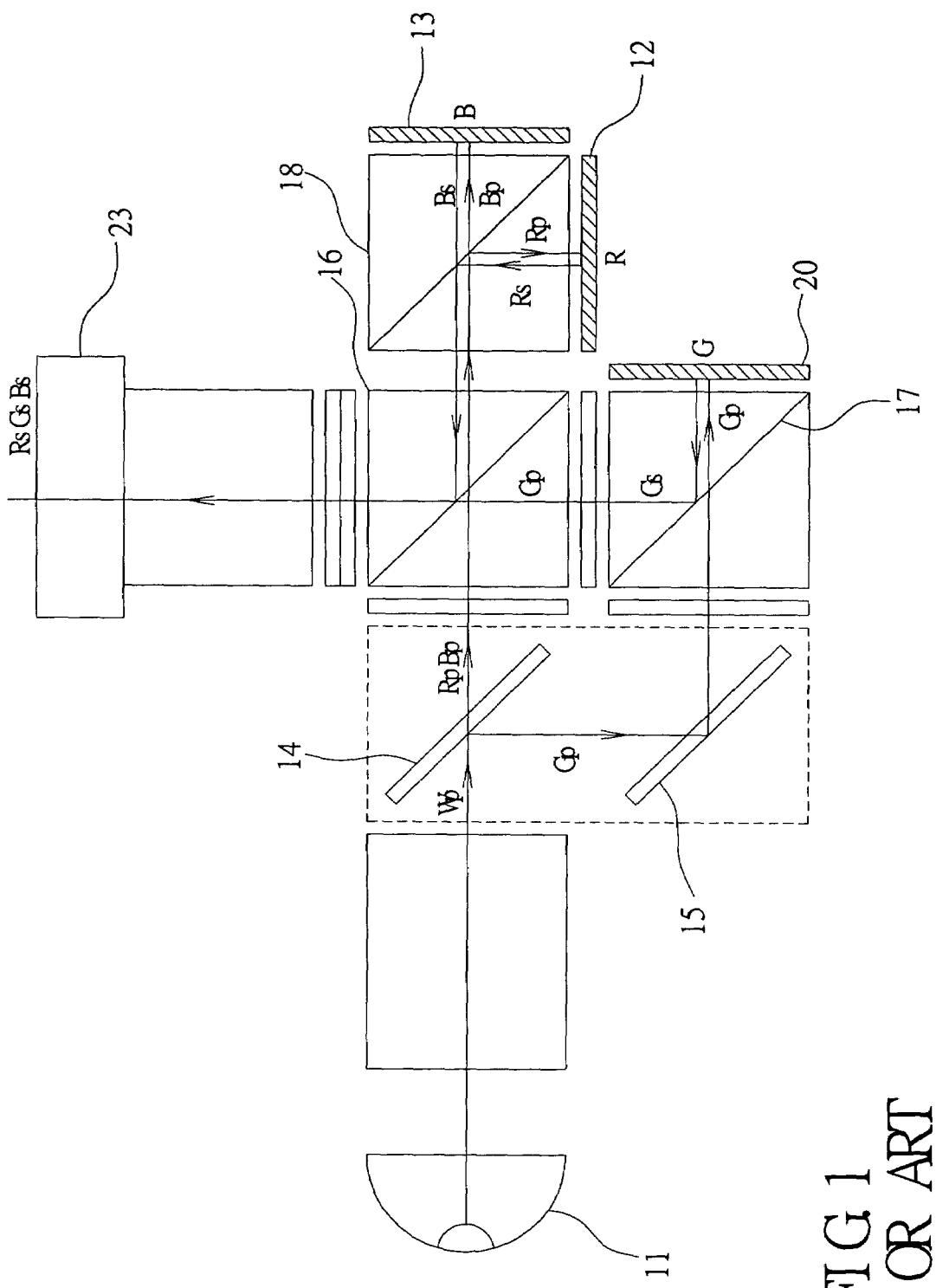
FIG. 1 is an architectural diagram of a conventional liquid crystal projection system.
Figure 2:
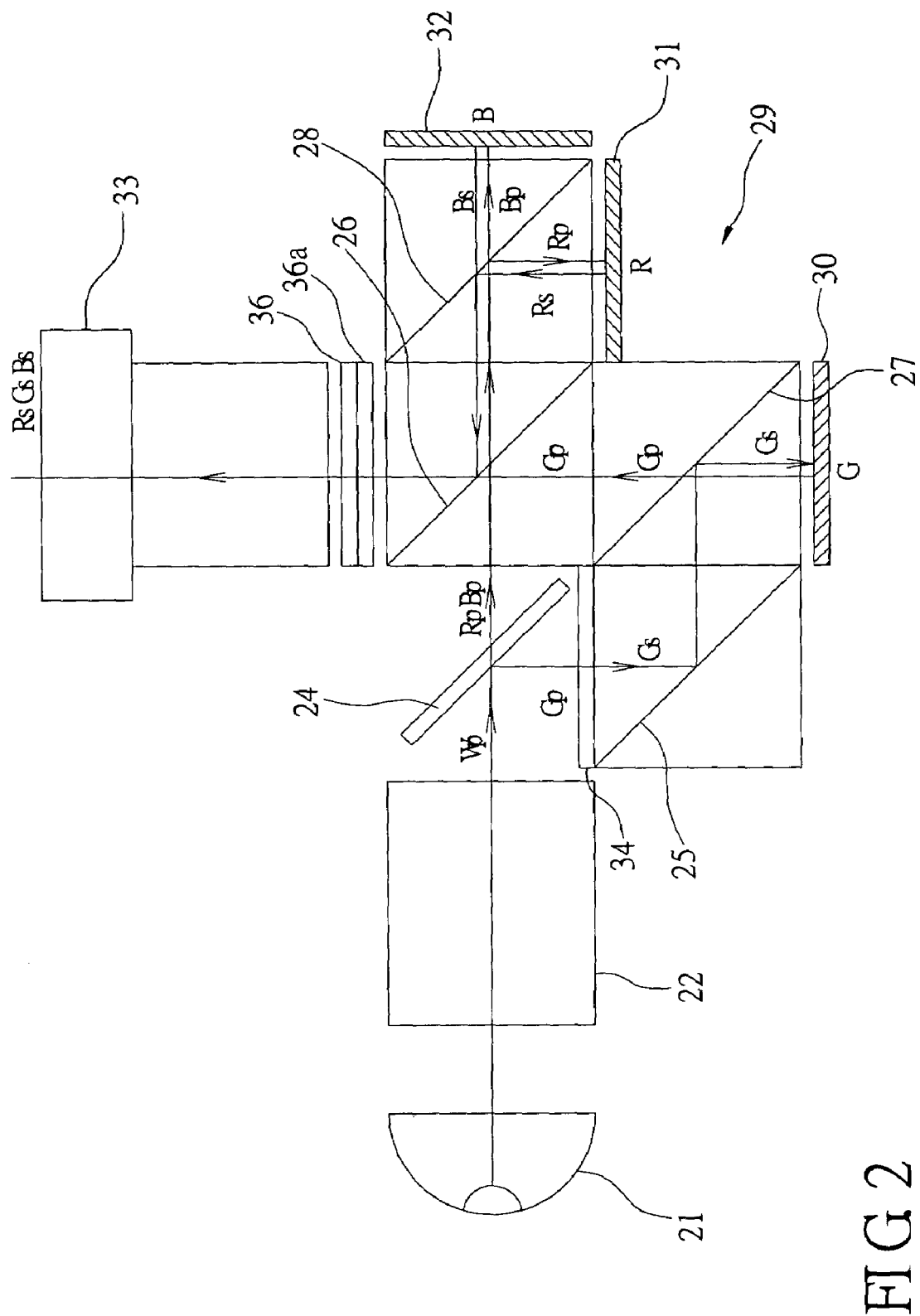
FIG. 2 is an architectural diagram according to a first embodiment of the present invention.

As shown in FIG. 2, a liquid crystal projection system according to a first embodiment of the present invention comprises a light source 21 for emitting white light, a polarizing component 22 for polarizing the white light, a dichroic mirror 24 for splitting the light beam, a reflecting prism 25 for reflecting the light beam, a first polarizing component 26 and a second polarizing component 27 for polarization of light, a dichroic component 28 for dichroic processing, a modulating device 29 for light modulation, and a projection lens 33 for output light beam projection. The polarizing component 22 is located in the output optical path of the light source 21 to split unpolarized white light into a polarized light source (S-polarization or P-polarization) of the three primary colors (R, G, B).

In the above illustration, the dichroic mirror 24 and the reflecting prism 25 are located in the output direction of the polarizing component 22 to split the output light beam of the polarizing component into two light beams. The dichroic mirror 24 splits the output polarized light source of the three primary colors of the polarizing component 22 into two light beams, one being dual 5 primary color polarized light beams directly output by the dichroic mirror 24, the other being a single primary color polarized light beam reflected by the reflecting prism 25. The first polarizing component 26 is located beside the dichroic mirror 24 and used to transmit or reflect the dual primary color polarized light beams according to the polarization state (P-polarization or S-polarization). The second polarizing component 27 is located beside the reflecting prism 25 and used to transmit or reflect the single primary color polarized light beam according to the polarization state (P-polarization or S-polarization).

The dichroic component 28 is located beside the first polarizing component 15 26 and used to reflect one of the dual primary color polarized light beams and transmit the other. The modulating device 29 modulates the input polarized light into polarized light of the other polarization state including image signals and then reflects the same for output. The modulating device 29 comprises a first reflective-type liquid crystal panel 30, a second reflective-type liquid 20 crystal panel 31, and a third reflective-type liquid crystal panel 32. The first reflective-type liquid crystal panel 30 is located beside the second polarizing component 27. The second and third reflective-type liquid crystal panels 31 and 32 are located at two sides of the dichroic component 28, respectively. The projection lens 33 is located beside of the first polarizing component 26 and used to project the polarized light modulated by the modulation device 29 to a screen for display.

Additionally, a half wavelength retardation plate 34 is disposed beside the dichroic mirror 24. The half wavelength retardation plate 34 is used to change the polarization state (P-polarization or S-polarization) of light beam. As shown in FIG. 2, the light beam transmitted through the polarizing component 22 to the dichroic mirror 24 is of P-polarization. The half wavelength retardation plate 34 is located between the dichroic mirror 24 and the reflecting prism 25 and is used to change the polarization state of light beam. If the polarization state of a light beam is S-polarization, i.e., the light beam transmitted through the polarizing component 22 to the dichroic mirror 24 is of S-polarization, the half wavelength retardation plate 34 (not shown) is located between the dichroic mirror 24 and the first polarizing component 26 to change the polarization of the light beam. A polarizing plate 36 and a wavelength selective polarizing plate 36a are disposed between the first polarizing component 26 and the projection lens 33 to avoid nonuniformity or leakage of light during light transmission for enhancing the purification effect.

Reference is made to FIG. 2 again. The output light of the polarizing component 22 is Wp. The dichroic mirror 24 reflects the green light Gp in the polarized light source of the three primary colors Wp and transmits the red light Rp and blue light Bp. The polarization of the green light Gp is changed to become a green light Gs by the half wavelength retardation plate 34. The green light Gs is reflected by the reflecting prism 25 to the second polarizing component 27. The second polarizing component 27 is a polarizing beam splitter (PBS), which transmits P-polarized light and reflected polarized light. Therefore, the green light Gs is reflected by the second polarizing component 27 to the first reflective-type liquid crystal panel 30, and is then modulated by the first reflective-type liquid crystal panel 30 into a green light Gp of the other polarization state including image signals. This green light Gp is reflected to the second polarizing component 27 and then transmitted to the first polarizing component 26. The red and blue light (RpBp) output by the dichroic mirror 24 is transmitted to the first polarizing component 26. The first polarizing component 26 is a PBS, which also transmits P-polarized light and reflected polarized light. Therefore, the red and blue light (RpBp) is transmitted to the dichroic component 28. The dichroic component 28 is a dichroic prism, which reflects the red light R and transmits the blue light B. That is, the red light Rp is reflected to the second reflective-type liquid crystal panel 31, while the blue light Bp is transmitted to the third reflective-type liquid crystal panel 32. The red light Rp is modulated by the second reflective-type liquid crystal panel 31 into a red light Rs of the other polarization state including image signals. This red light Rs is then reflected to the dichroic component 28. The blue light Bp is modulated by the third reflective-type liquid crystal panel 32 into a red light Bs of the other polarization state including image signals. This blue light Bs is then reflected to the dichroic component 28. The dichroic component 28 outputs the red and blue light (RsBs) to the first polarizing component 26. The first polarizing component 26 reflects the red and blue light RsBs output by the dichroic component 28 to the projection lens 33, and transmits the green light Gp output by the second polarizing component 27 to the projection lens 33. The green light Gp is then converted into a green light Gs by the wavelength selective polarizing plate 36a. Subsequently, the polarizing plate 36 purifies the lights RsGsBs. Finally, the light beam output by the projection lens 33 includes image signals, and is projected to a screen for displaying the image frame.

In the above illustration, the single primary color polarized light beam is a green light Gp, which is transmitted to the reflecting prism 25 of glass medium and then through the PBS 27 of glass medium to the reflective-type liquid crystal panel 30. The red and blue lights Rp and Bp are transmitted through the PBS 26 of glass medium and the dichroic prism 28 to the reflective-type liquid crystal panels 31 and 32, respectively. Therefore, the optical paths of the dual primary color polarized light beams Rp and Bp and the single primary color light beam Gp from the light source 21 to the reflective-type liquid crystal panels 30, 31, and 32 are equal. The drawbacks of distortion and reduction of uniformity of light source of the liquid crystal projection system during projection can be reduced. The above reflecting prism 25 can be a triangular reflecting prism.

Figure 3:
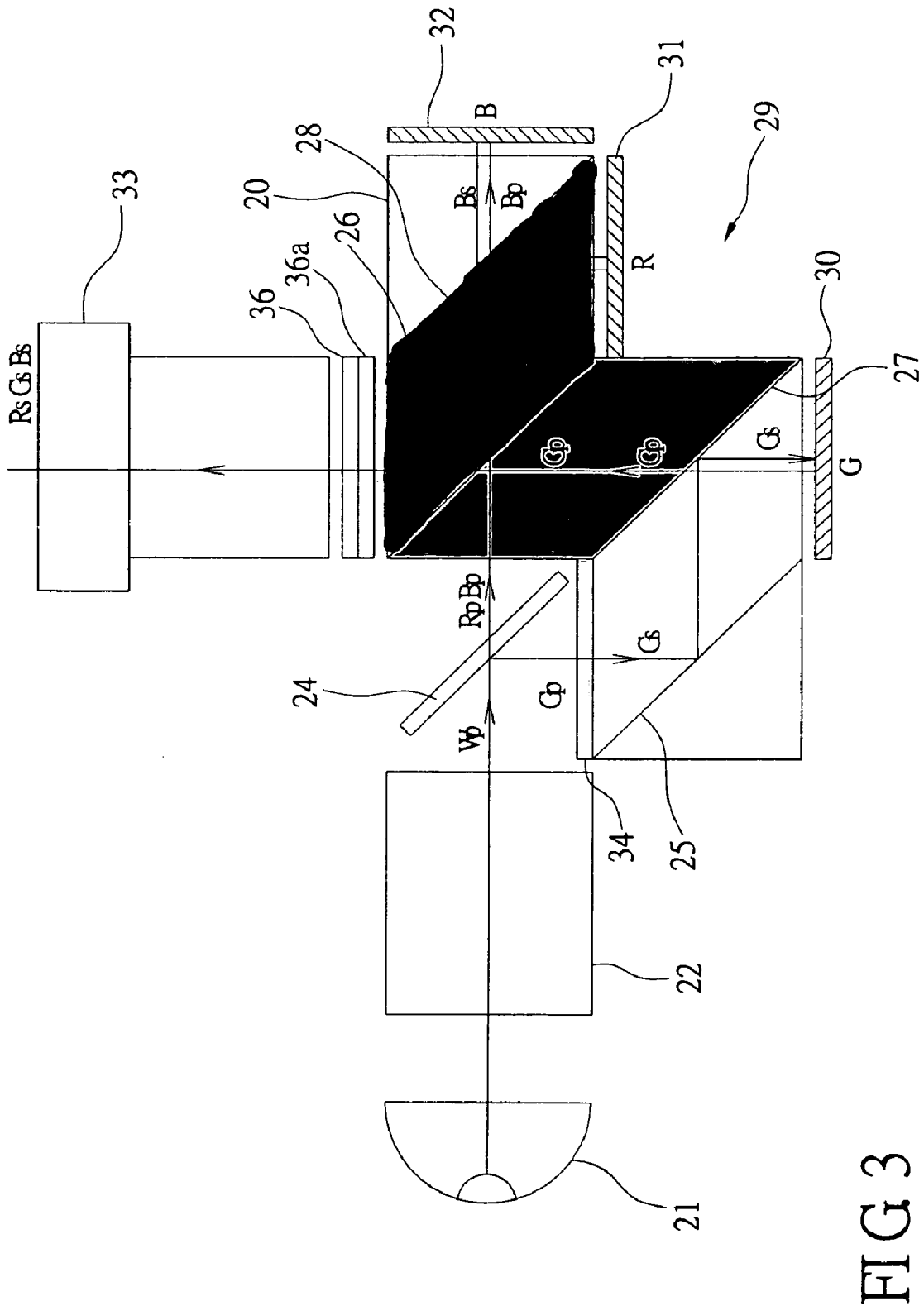
FIG. 3 is an architectural diagram according to a second embodiment of the present invention.

Reference is made to FIG. 3 as well as FIG. 2. The reflecting prism 25, the first polarizing component 26, the second polarizing component 27, and the dichroic component 28 can be combined into a Z-shaped prism module 20. The Z-shaped prism module 20 matches the use of the polarizing component 22, the half wavelength retardation plate 34, the modulating device 29, the wavelength selective polarizing plate 36a, the polarizing plate 36, and the projection lens 33 to make the optical paths of the dual primary color polarized light beams Rp and Bp and the single primary color light beam Gp from the light source 21 to the reflective-type liquid crystal panels 30, 31, and 32 equal. The drawbacks of distortion and reduction of uniformity of light source of the liquid crystal projection system during projection can be reduced. The above reflecting prism 25 can be a triangular reflecting prism.

Figure 4:
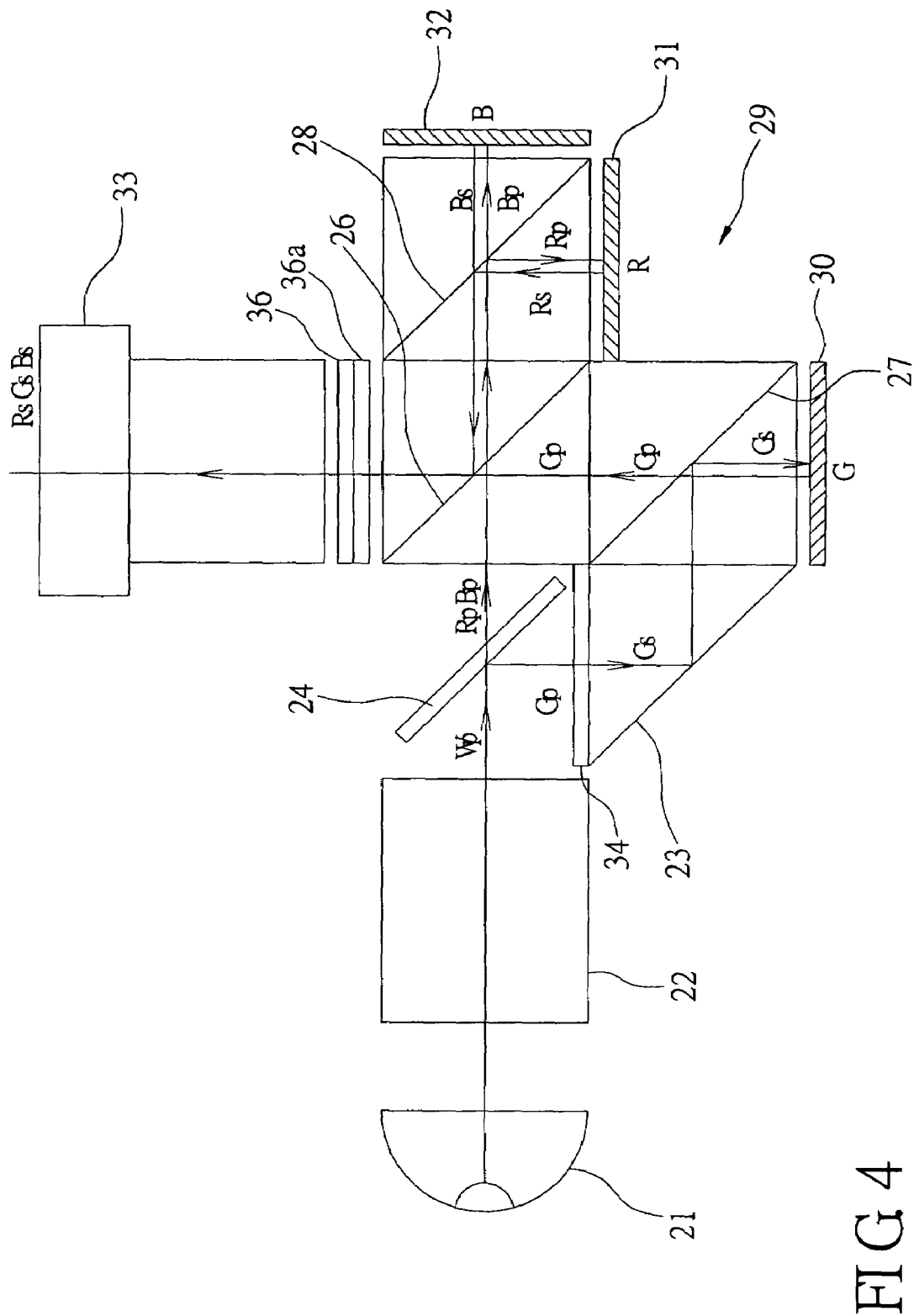
FIG. 4 is an architectural diagram according to a third embodiment of the present invention.

Reference is made to FIG. 4 as well as FIG. 2. The reflecting prism 25 used in the first embodiment is replaced with a PBS 23 in this embodiment. The PBS 23 can transmit or reflect the single primary color polarized light beam according to the polarization state (P-polarization or S-polarization). Therefore, the PBS 23 effectively replaces the function of the reflecting prism 25 at the same position. In this embodiment, the same optical paths as the first embodiment can be obtained. The above PBS 23 can be a triangular PBS.

Figure 5:
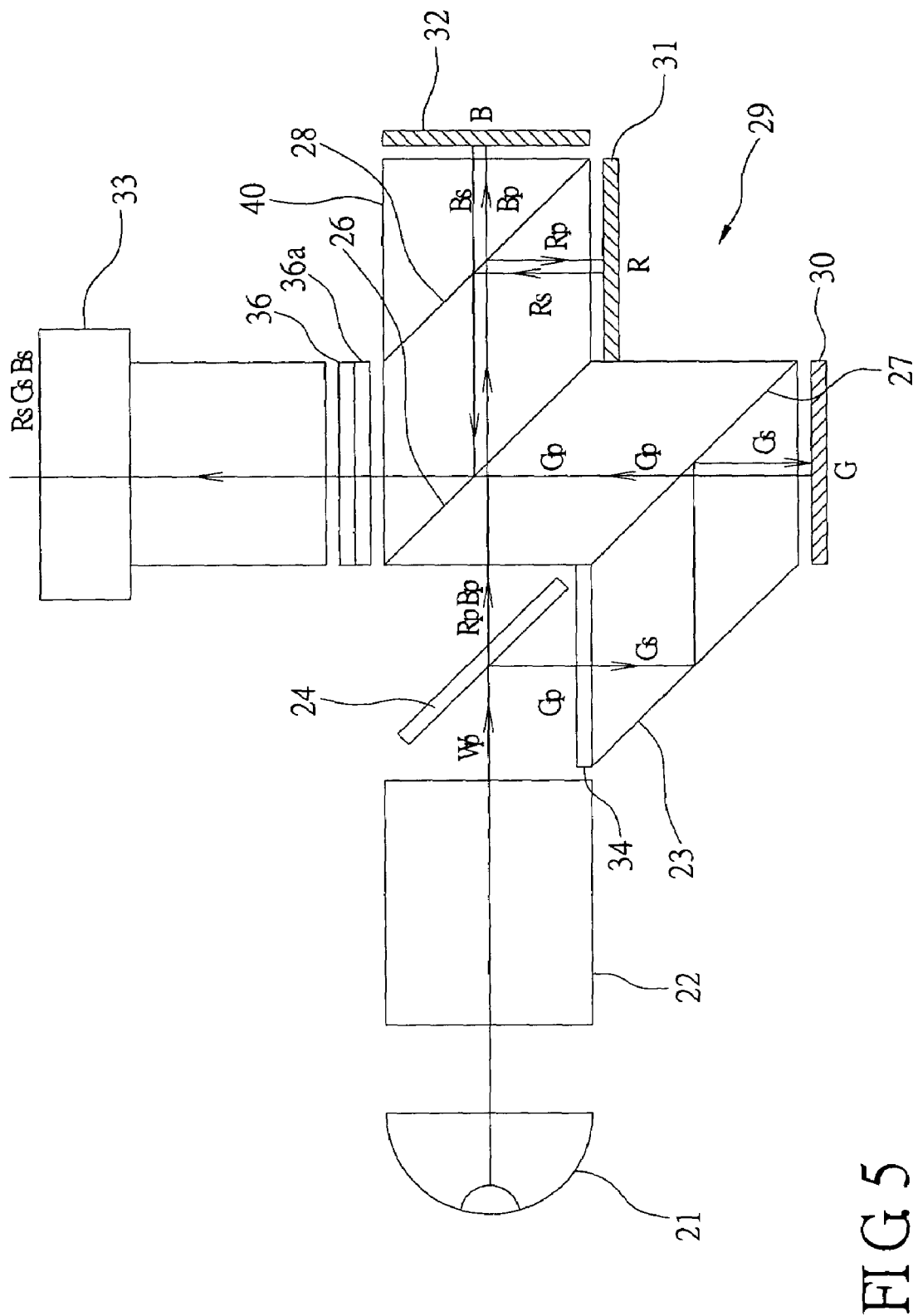
FIG. 5 is an architectural diagram according to a fourth embodiment of the present invention.

Reference is made to FIG. 5 as well as FIG. 4. The PBS 23, the first polarizing component 26, the second polarizing component 27, and the dichroic component 28 can be combined into a Z-shaped prism module 40. The Z-shaped prism module 40 can match the use of the polarizing component 22, the half wavelength retardation plate 34, the modulating device 29, the wavelength selective polarizing plate 36a, the polarizing plate 36, and the projection lens 33 to make the optical paths of the dual primary color polarized light beams Rp and Bp and the single primary color light beam Gp from the light source 21 to the reflective-type liquid crystal panels 30, 31, and 32 equal. The drawbacks of distortion and reduction of uniformity of light source of the liquid crystal projection system during projection can be improved. The above PBS 23 can be a triangular PBS.

Figure 6:
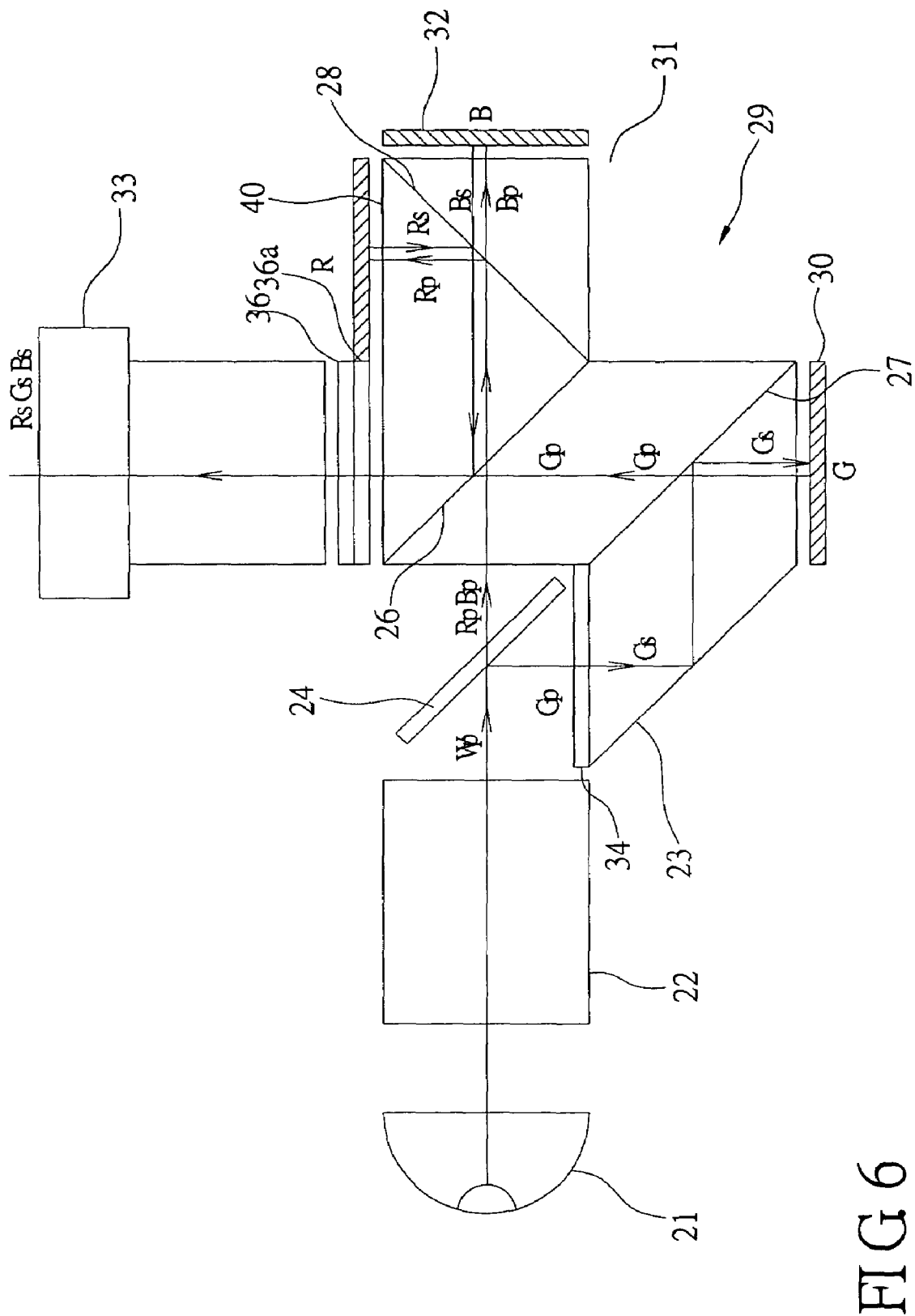
FIG. 6 is an architectural diagram according to a fifth embodiment of the present invention.

Reference is made to FIG. 6 as well as FIGS. 2 to 5. In this embodiment, the reflective-type liquid crystal panel 31 originally located at one side of the dichroic prism 28 in the first, second, third, and fourth embodiments is placed at the other side. Nonetheless, the same optical paths as the first, second, third, and fourth embodiments can be obtained.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

What is claimed is:

1. A liquid crystal projection system, comprising:
   a light source for emitting a white light source;
   a polarizing component for polarizing said white light source to generate a polarized light source;
   a dichroic mirror for receiving said polarized light source and splitting said polarized light source into dual primary color lights and a single primary color light having a first predetermined polarization for output;
   a half wavelength retardation plate disposed between said dichroic mirror and a reflecting prism for receiving said single primary color light and then reflecting said single primary color light for output;
   a first polarizing component disposed at another output side of said dichroic mirror for receiving and then polarizing said dual primary color lights;
   a second polarizing component disposed at an output side of said reflecting prism for receiving said single primary color light and then outputting said single primary color light with said first predetermined polarization;
   a dichroic component disposed beside said first polarizing component for receiving and splitting said dual primary color light; said reflecting prism being a first parallelogram-shaped body, said first and second polarizing components being a second parallelogram-shaped body, and said dichroic component being a third parallelogram-shaped body; wherein said first, said second and said third parallelogram-shaped bodies are integrated into a single Z-shaped prism module;
   a modulating device disposed beside said second polarizing component and said dichroic component for receiving, modulating into another polarization, and then reflecting for output said dual primary color lights and said single primary color light; and
   a projection lens disposed beside said first polarizing component for receiving said modulated dual and single primary color lights and projecting out to a screen for display, wherein said single primary color light having the same optical path length as said dual primary color lights.

2. The liquid crystal projection system as claimed in claim 1, wherein said half wavelength retardation plate is disposed between said dichroic mirror and said first polarizing component.

3. The liquid crystal projection system as claimed in claim 1, wherein said reflecting prism is a triangular reflecting prism.

4. The liquid crystal projection system as claimed in claim 1, wherein said first polarizing component is a polarizing beam splitter.

5. The liquid crystal projection system as claimed in claim 1, wherein said second polarizing component is a polarizing beam splitter.

6. The liquid crystal projection system as claimed in claim 1, wherein said dichroic component is a dichroic prism.

7. The liquid crystal projection system as claimed in claim 1, wherein said modulating device comprises a first reflective-type liquid crystal panel, a second reflective-type liquid crystal panel and a third reflective-type liquid crystal panel, and said first reflective-type liquid crystal panel is located beside said second polarizing component, and said second reflective-type liquid crystal panel and said third reflective-type liquid crystal panel are located at two sides of said dichroic component, respectively.

8. The liquid crystal projection system as claimed in claim 1, wherein a polarizing plate and a wavelength selective polarizing plate are disposed between said first polarizing component and said projection lens.

9. A liquid crystal projection system, comprising:
   a light source for emitting a white light source;
   a polarizing component for polarizing said white light source to generate a polarized light source;
   a dichroic mirror for receiving said polarized light source and splitting said polarized light source into dual primary color lights and a single primary color light with a first predetermined polarization for output;
   a half wavelength retardation plate disposed between said dichroic mirror and a polarizing beam splitter for reflecting for output said single primary color light;
   a first polarizing component disposed at another output side of said dichroic mirror for receiving and then polarizing said dual primary color lights;
   a second polarizing component disposed at an output side of said polarizing beam splitter for receiving said single primary color light and then outputting said single primary color light with the first predetermined polarization;
   a dichroic component disposed beside said first polarizing component for receiving and splitting said dual primary color light; said polarizing beam splitter being a first parallelogram-shaped body, said first and second polarizing components being a second parallelogram-shaped body, and said dichroic component being a third parallelogram-shaped body; wherein said first, said second and said third parallelogram-shaped bodies are integrated into a single, Z-shaped prism module;
   a modulating device disposed beside said second polarizing component and said dichroic component for receiving, modulating into another polarization, and then reflecting for output said dual primary color lights and said single primary color light; and
   a projection lens disposed beside said first polarizing component for receiving said modulated dual and single primary color lights and projecting out to a screen for display, wherein said single primary color light having the same optical path length as said dual primary color lights.

10. The liquid crystal projection system as claimed in claim 9, wherein said half wavelength retardation plate is disposed between said dichroic mirror and said first polarizing component.

11. The liquid crystal projection system as claimed in claim 9, wherein said polarizing beam splitter is a triangular polarizing beam splitter.

12. The liquid crystal projection system as claimed in claim 9, wherein said first polarizing component is a polarizing beam splitter.

13. The liquid crystal projection system as claimed in claim 9, wherein said second polarizing component is a polarizing beam splitter.

14. The liquid crystal projection system as claimed in claim 9, wherein said dichroic component is a dichroic prism.

15. The liquid crystal projection system as claimed in claim 9, wherein said modulating device comprises a first reflective-type liquid crystal panel, a second reflective-type liquid crystal panel and a third reflective-type liquid crystal panel, said first reflective-type liquid crystal panel is located beside said second polarizing component, and said second reflective-type liquid crystal panel and said third reflective-type liquid crystal panel are located at two sides of said dichroic component, respectively.

16. The liquid crystal projection system as claimed in claim 9, wherein a polarizing plate and a wavelength selective polarizing plate are disposed between said first polarizing component and said projection lens.

* * * * *

UNITED STATES PATENT AND TRADEMARK OFFICE
CERTIFICATE OF CORRECTION

PATENT NO.       : 7,616,266 B2                                Page 1 of 1
APPLICATION NO.  : 11/115168
DATED            : November 10, 2009
INVENTOR(S)      : Tzong et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 513 days.

Signed and Sealed this

Nineteenth Day of October, 2010

David J. Kappos
*Director of the United States Patent and Trademark Office*